(12) United States Patent
Gu

(10) Patent No.: US 8,580,024 B2
(45) Date of Patent: Nov. 12, 2013

(54) INKJET INK COMPOSITIONS COMPRISING MODIFIED PIGMENTS

(75) Inventor: Feng Gu, Westford, MA (US)

(73) Assignee: Cabot Corporation, Boston, MA (US)

( * ) Notice: Subject to any disclaimer, the term of this patent is extended or adjusted under 35 U.S.C. 154(b) by 349 days.

(21) Appl. No.: 12/455,597

(22) Filed: Jun. 4, 2009

(65) Prior Publication Data

US 2010/0307377 A1 Dec. 9, 2010

(51) Int. Cl.
*C09D 11/02* (2006.01)

(52) U.S. Cl.
USPC ................ 106/31.74; 106/31.6; 106/31.9

(58) Field of Classification Search
USPC .................... 106/31.6, 31.9, 31.74
See application file for complete search history.

(56) References Cited

U.S. PATENT DOCUMENTS

| | | | |
|---|---|---|---|
| 4,835,074 A | 5/1989 | Bolster et al. | |
| 5,348,997 A | 9/1994 | Kato et al. | |
| 5,851,280 A | 12/1998 | Belmont et al. | |
| 6,045,663 A | 4/2000 | Cha | |
| 6,199,073 B1 | 3/2001 | Peairs et al. | |
| 6,337,358 B1 | 1/2002 | Whitehouse et al. | |
| 6,699,319 B2 | 3/2004 | Adams et al. | |
| 6,723,783 B2 | 4/2004 | Palumbo et al. | |
| 7,173,078 B2 | 2/2007 | Lamprey et al. | |
| 7,459,103 B2 | 12/2008 | Srinivas | |
| 2004/0171725 A1 | 9/2004 | Richardson et al. | |
| 2007/0100024 A1* | 5/2007 | Gu et al. | 523/160 |
| 2007/0211126 A1* | 9/2007 | Bauer et al. | 347/100 |
| 2007/0277699 A1* | 12/2007 | Bauer | 106/31.6 |
| 2009/0229489 A1* | 9/2009 | Gu | 106/31.75 |
| 2010/0269732 A1* | 10/2010 | Sekiyama | 106/31.9 |

FOREIGN PATENT DOCUMENTS

| | | |
|---|---|---|
| WO | WO01/51566 | 7/2001 |
| WO | WO 2009084714 A1 * | 7/2009 |
| WO | WO 2010141071 A1 * | 12/2010 |

OTHER PUBLICATIONS

Ohkita, Kumakazu et al., "The Reaction of Carbon Black Surface with 2,2-Diphenyl-1-Picrylhydrazyl," *Carbon*, vol. 10, pp. 631-636 (1972).

Stankovich, Sasha et al., "Synthesis of graphene-based nanosheets via chemical reduction of exfoliated graphite oxide," *Carbon*, vol. 45, pp. 1558-1565 (2007).

Wang, Guan-Wu et al., "1,4-Fullerenols CArOH: Synthesis and Functionalization," *Organic Letters*, vol. 11, No. 7, pp. 1507-1510 (2009).

* cited by examiner

*Primary Examiner* — Kaj K Olsen
*Assistant Examiner* — Veronica F Faison

(57) ABSTRACT

The present invention relates to an inkjet ink composition comprising a liquid vehicle and a modified pigment, which comprises the reaction product of a non-modified pigment and at least one reagent having the formula $H_2N\text{-}A\text{-}Y$. The modified pigments themselves, as well as methods for preparing them, are also described.

41 Claims, 1 Drawing Sheet

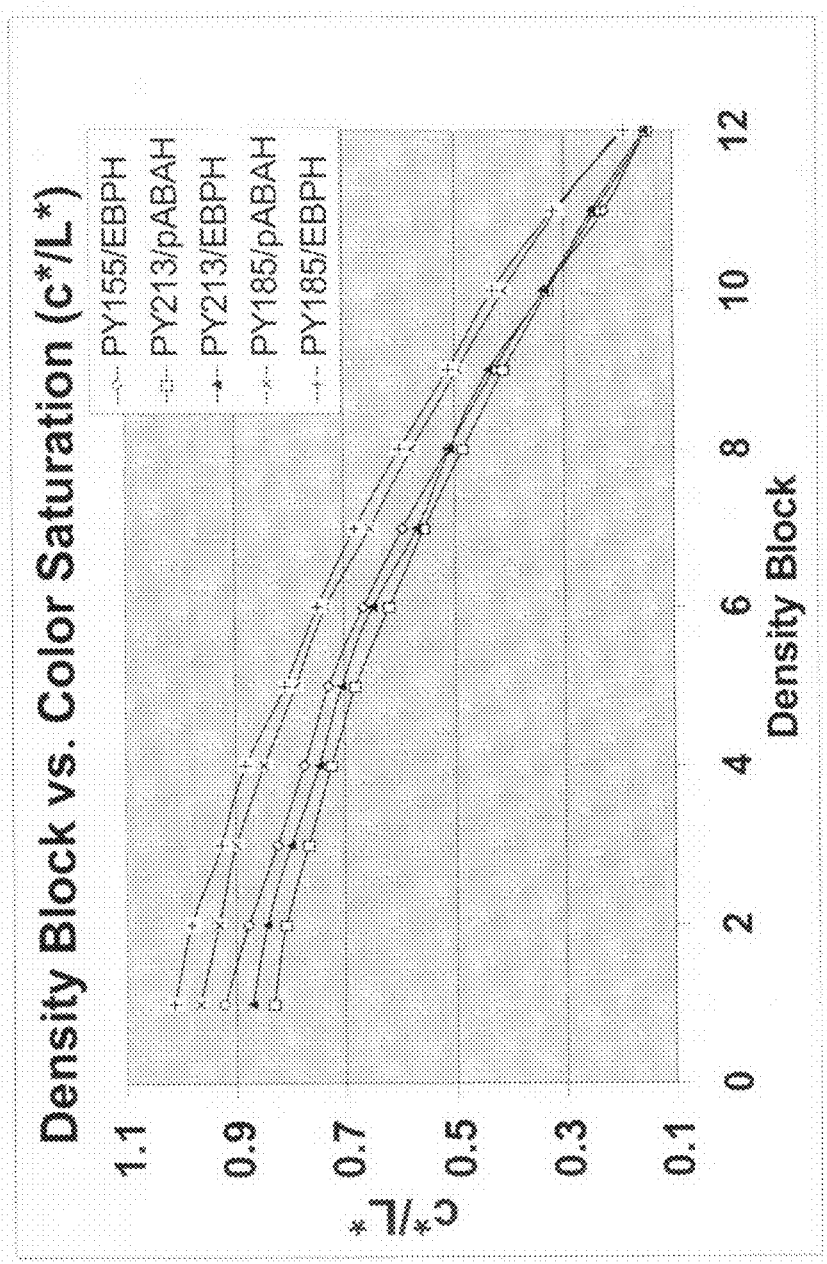

INKJET INK COMPOSITIONS COMPRISING MODIFIED PIGMENTS

BACKGROUND OF THE INVENTION

1. Field of the Invention

The present invention relates to inkjet ink compositions comprising modified pigments which are the reaction product of a pigment and a specified reagent, such as a hydrazine reagent, as well as to the modified pigments themselves and methods of preparing them.

2. Description of the Related Art

An inkjet ink composition generally consists of a vehicle, which functions as a carrier, and a colorant such as a dye or pigment. Additives and/or cosolvents can also be incorporated in order to adjust the inkjet ink to attain the desired overall performance properties.

In general, pigments alone are not readily dispersible in liquid vehicles. A variety of techniques have been developed which can provide stable pigment dispersions which can be used in inkjet printing. For example, dispersants can be added to the pigment to improve its dispersibility in a particular medium. Examples of dispersants include water-soluble polymers and surfactants. Typically, these polymeric dispersants have a molecular weight less than 20,000 in order to maintain solubility and therefore pigment stability.

The surface of pigments contains a variety of different functional groups, and the types of groups present depend on the specific class of pigment. Several methods have been developed for grafting materials and, in particular, polymers to the surface of these pigments. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Modified pigments have also been developed which provide ink compositions with improved properties, such as dispersibility, without the need for an external dispersant. Typically, methods to prepare these modified pigments involve preparing a dispersion of a pigment in a medium and reacting the surface of this pigment with various types of reagents. The resulting product is a modified pigment comprising the pigment having attached at least one organic group, such as an organic group comprising at least one ionic group, ionizable group, or a mixture thereof. For example, modified pigments can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174. Such methods provide for a more stable attachment of the groups onto the pigment compared to dispersant type methods, which use, for example, polymers and/or surfactants.

Other methods for preparing modified pigments include reacting a pigment having available functional groups with a reagent comprising the organic group, such as is described in, for example, U.S. Pat. Nos. 6,723,783, 6,911,073, and 7,173,078. Such functional pigments may be prepared using the methods described in the references above. In this way, the pigment is modified to comprise a functional group not inherent to its surface but which can further react with a reagent having the target organic group.

Carbonaceous materials, such as carbon black, have also been shown to react with hydrazine reagents under specific types of conditions. For example, U.S. Pat. Nos. 6,723,783 and 7,173,078, as well as U.S. Patent Application Publication No. 2004/0171725, each relate to the reaction of various types of modified pigments, which comprise a pigment having an attached functional group, with specified reagents, including hydrazine reagents. However, such methods require the initial formation of a modified pigment as a precursor which is then further modified using the hydrazine reagent. Furthermore, it is known that hydrazine can be used as a reducing agent for an oxidized carbon black and graphite oxide, which are carbonaceous materials that have been pretreated with an oxidizing agent to introduce higher levels of oxygen-containing groups. Again, though, this method requires the use of a previously modified carbon black. Also, U.S. Pat. No. 4,835,074 describes the chemical modification of acetylene blacks, with or without added oxygen functionality, with covalently bonded nitrogen-containing groups. These modified acetylene blacks are used for electrochemical cells.

While various types of modified pigments have been prepared, some of which can be used in inkjet ink compositions, there remains a need to provide alternative modified pigments, particularly by reaction of a pigment that is itself not a previously modified pigment.

SUMMARY OF THE INVENTION

The present invention relates to an inkjet ink composition comprising a liquid vehicle and at least one modified pigment which comprises the reaction product of a) a pigment, which is not a modified pigment, and b) at least one reagent having the formula $H_2N$-A-Y, wherein Y is H, a C1-C12 alkyl group, an aromatic group, a polymeric group, or a group comprising a —$C(O)$A-$NH_2$ group, and A is O, NH, or S. The present invention further relates to the modified pigments themselves, as well as to methods for preparing the modified pigments, which comprises the steps of combining and reacting the pigment and the reagent. Optionally, a second reagent may be added to further react with the resulting modified pigment.

It is to be understood that both the foregoing general description and the following detailed description are exemplary and explanatory only and are intended to provide further explanation of the present invention, as claimed.

BRIEF DESCRIPTION OF THE DRAWINGS

FIG. 1 shows color saturation values at various density blocks for several inkjet ink compositions of the present invention.

DETAILED DESCRIPTION OF THE INVENTION

The present invention relates to inkjet ink compositions comprising a liquid vehicle and at least one modified pigment, to modified pigments, and to methods of preparing modified pigments.

The inkjet ink composition of the present invention comprises a liquid vehicle and at least one modified pigment. The liquid vehicle may be either a non-aqueous vehicle, which is a vehicle that contain less than 50% water or is not miscible with water, or an aqueous vehicle, which is a vehicle that contains greater than 50% by weight water, and can be, for example, water or mixtures of water with water miscible solvents such as alcohols. Preferably, the vehicle is an aqueous vehicle, such as water, and the inkjet ink composition is an aqueous inkjet ink composition.

The modified pigment of the inkjet ink composition of the present invention comprises the reaction product of a pigment and a specific reagent, described in more detail below. Any pigment known in the art may be used, including for example, oxidized carbonaceous pigments (which are carbonaceous pigments, such as carbon black, that have been treated using an oxidizing agent in order to introduce ionic and/or ionizable groups onto the surface and generally have a pH value of less than 7.0), non-oxidized carbonaceous pigments (including carbon blacks generally having a pH greater than 7.0), and non-modified pigments (which are pigments that have not been treated so as to have attached organic groups). For example, the pigment can be an oxidized carbon black prepared by treating carbon black with an oxidizing agent such as oxygen gas, ozone, peroxides such as hydrogen peroxide, persulfates, including sodium and potassium persulfate, hypohalites such a sodium hypochlorite, oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. Other surface modification methods, such as chlorination and sulfonylation, may also be used in combination with the oxidizing agent in order to introduce additional types of ionic or ionizable groups. In addition, non-oxidized carbon blacks, including those used to prepare the oxidized carbon blacks, can also be used.

In addition, the pigment can also be an organic colored pigment, including a blue, a black, a brown, a cyan, a green, a white, a violet, a magenta, a red, an orange, or a yellow organic pigment. Mixtures of different pigments can also be used. Organic colored pigments comprise organic colorants, which are the chromophoric materials that provide the essential color of the pigment, and these pigments can be classified by their organic colorant type. Suitable organic colorant classes for the organic colored pigments useful in the inkjet ink compositions of the present invention include, for example, anthraquinones, phthalocyanine blues, phthalocyanine greens, diazos, monoazos, pyranthrones, perylenes, heterocyclic yellows, quinolonoquinolones, isoindolines, isoindolinones, bisacetoacetarylides, indanthrones, quinacridones, and (thio)indigoids. Such pigments are commercially available in either powder or press cake form from a number of sources including, for example, BASF Corporation, Engelhard Corporation and Sun Chemical Corporation. Examples of other suitable colored pigments are described in the Colour Index, 3rd edition (The Society of Dyers and Colourists, 1982).

As a particular example, the pigment can be an organic colored pigment comprising at least one organic colorant having at least one carbonyl group. As used herein, a "carbonyl group" is a group having a C=O functionality. Suitable examples of carbonyl groups include, but are not limited to, ketone groups (having the general formula —C(O)R), aldehyde groups (having the general formula —C(O)H), ester groups (having the general formula —C(O)OR), amide groups (having the general formula —C(O)NR$_2$), imide groups (having the general formula —C(O)NRC(O)—, urea groups (having the general formula —NR—C(O)NR$_2$), anhydride groups (having the general formula —O—C(O) OR), or carboxylic acid groups or salt thereof (having the general formula —C(O)OH). R can be, independently, an alkyl group or an aromatic group. Suitable organic colored pigments comprising such organic colorants are yellow pigments, including, for example, those comprising isoindoline colorants, isoindolinone colorants, or bisacetoacetarylide colorants. Specific examples include Pigment Yellow 155, Pigment Yellow 213, Pigment Yellow 185, and Pigment Yellow 139. Each of these comprises organic colorants having at least one carbonyl group. For example, Pigment Yellow 155 and Pigment Yellow 213 comprise yellow colorants having ester groups while Pigment Yellow 185 and Pigment Yellow 139 comprise yellow colorants having imide groups, specifically barbituric acid groups.

In a preferred embodiment, the modified pigment of the inkjet ink composition of the present invention comprises a pigment that itself is not a modified or treated pigment. In particular, the pigment preferably does not have attached at least one organic group and is not prepared using methods known for attaching organic groups to the surface of a pigment. Also, preferably, the modified pigment of the inkjet ink composition of the present invention is not an oxidized carbon black, as described above. Thus, the modified pigment is preferably not a pigment that has been initially modified or treated to attach specific types of reactive functional groups that is then further modified using at least one of the reagents described in more detail below. Surprisingly, it has been found that such non-modified pigments can be used to form modified pigments that can be used in inkjet ink compositions.

As described above, the modified pigment of the inkjet ink composition of the present invention comprises the reaction product of a pigment and at least one reagent having the formula H$_2$N-A-Y. In this formula, A is a heteroatom or group having at least one available lone pair of electrons, such as O, NH, or S, and Y is H, a C1-C12 alkyl group, an aromatic group, or a polymeric group. Y may also comprise a —C(O) A—NH$_2$ group. Preferably, A is NH. For example, A can be NH and Y can be an aromatic group, and the reagent is an arylhydrazine. Also, A can be NH and Y can be a C1-C12 alkyl group, and the reagent is an alkyhydrazine. In addition, when A is NH, Y can be H, and the reagent is therefore hydrazine. Furthermore, A can be NH and Y can be a —C(O) NH—NH$_2$ group (i.e., a dihydrazide). Specific examples include H$_2$NNH—C(O)—NH—NH$_2$ (carbohydrazide), H$_2$NNH—C(O)—C(O)—NH—NH$_2$ (oxalyl dihydrazide), and H$_2$NNH—C(O)—C$_6$H$_4$—C(O)—NH—NH$_2$ (terephthalic dihydrazide).

Preferably, the group Y of the reagent comprises at least one ionic group, at least one ionizable group, or a mixture of at least one ionic group and at least one ionizable group. The ionic group is either anionic or cationic and is associated with a counterion of the opposite charge including counterions such as Na$^+$, K$^+$, Li$^+$, NH$_4^+$, NR$_4^+$, acetate, NO$_3$—, SO$_4^{-2}$, RSO$_3^-$, $^{ROSO}$$_3^-$, OH$^-$, and Cl$^-$, where R of these counterions represents hydrogen or a substituted or unsubstituted aryl and/or alkyl group. The ionizable group is one that is capable of forming an ionic group in the medium of use. Anionizable groups form anions and cationizable groups form cations. Ionic groups include those described in U.S. Pat. No. 5,698, 016, the description of which is fully incorporated herein by reference.

The anionic groups are negatively charged ionic groups that may be generated from groups having ionizable substituents that can form anions (anionizable groups), such as acidic substituents. They may also be the anion in the salts of ionizable substituents. Representative examples of anionic groups include —COO$^-$, —SO$_3^-$, —OSO$_3^-$, —HPO$_3^{31}$, —OPO$_3^{-2}$, and —PO$_3^{-2}$. Preferably, the anionic group comprises a counterion that is a monovalent metal salt such as a Na$^+$ salt, a K$^+$ salt, a Li$^+$ salt. The counterion may also be an ammonium salt, such as a NH4$^+$ salt. Representative examples of anionizable groups include —COOH, —SO$_3$H, —PO$_3$H$_2$, —R'SH, —R'OH, and —SO$_2$NHCOR', where R' of these groups represents hydrogen or an organic group such as a substituted or unsubstituted aryl and/or alkyl group. As specific examples, Y may comprise at least one sulfonic acid group, carboxylic acid group, or salt thereof.

The cationic groups are positively charged ionic groups that may be generated from ionizable substituents that can form cations (cationizable groups), such as protonated amines. For example, alkyl or aryl amines may be protonated in acidic media to form ammonium groups —NR'$_2$H$^+$, where R' of this group represent an organic group such as a substituted or unsubstituted aryl and/or alkyl group. Cationic groups may also be positively charged organic ionic groups. Examples include quaternary ammonium groups (—NR'$_3^+$) and quaternary phosphonium groups (—PR'$_3^+$). Here, R' represents hydrogen or an organic group such as a substituted or unsubstituted aryl and/or alkyl group. As specific examples, Y may comprise at least one amine group or at least one ammonium group.

As a specific example, the group Y of the reagent may comprise at least one geminal bisphosphonic acid group, partial esters thereof, or salts thereof—that is, the organic group may comprise at least two phosphonic acid groups, partial esters thereof, or salts thereof that are directly bonded to the same carbon atom. Such a geminal bisphosphonic acid group may also be referred to as a 1,1-diphosphonic acid group, partial ester thereof, or salt thereof. By "partial ester thereof" is meant that the phosphonic acid group may be a partial phosphonic acid ester group having the formula —PO$_3$RH, or a salt thereof, wherein R is an aryl, alkaryl, aralkyl, or alkyl group. Either or both of the phosphonic acid groups of the group Y may be a partial phosphonic acid ester group. Also, one of the phosphonic acid groups may be a phosphonic acid ester having the formula —PO$_3$R$_2$ while the other phosphonic acid group may be a partial phosphonic acid ester group, a phosphonic acid group, or a salt thereof. However, it is preferred that at least one of the phosphonic acid groups is either a phosphonic acid, a partial ester thereof, or salts thereof. By "salt" is meant that the phosphonic acid group is in a partially or fully ionized form having a cationic counterion. Either or both of the phosphonic acid groups of Y may be in either a partially or fully ionized form. Thus, Y may comprise at least one geminal bisphosphonic acid group, wherein either or both phosphonic acid groups have the formula —PO$_3$H$_2$, —PO$_3$H$^-$M$^+$ (monobasic salt), or —PO$_3^{-2}$M$^{+2}$ (dibasic salt), wherein M$^+$ is a cation such as Na$^+$, K$^+$, Li$^+$, or NR$_4^+$, wherein R of these cations, which can be the same or different, represents hydrogen or an organic group such as a substituted or unsubstituted aryl and/or alkyl group. Preferably, at least one of the phosphonic acid groups, and more preferably, both phosphonic acid groups of the geminal bisphosphonic acid group are phosphonic acid groups or salts thereof.

For example, the group Y of the reagent may comprise at least one group having the formula —CQ(PO$_3$H$_2$)$_2$, partial esters thereof, or salts thereof. Q is bonded to the geminal position and may be H, R, OR, SR, or NR$_2$ wherein R for these groups, which can be the same or different, is H, a C1-C18 saturated or unsaturated, branched or unbranched alkyl group, a C1-C18 saturated or unsaturated, branched or unbranched acyl group, an aralkyl group, an alkaryl group, or an aryl group. For example, Q may be H, R, OR, SR, or NR$_2$, wherein R, which can be the same or different, is H, a C1-C6 alkyl group, or an aryl group. Preferably Q is H, OH, or NH$_2$. As an additional example, the group Y of the reagent may comprise a group having the formula —(CH$_2$)$_n$—CQ(PO$_3$H$_2$)$_2$, partial esters thereof, or salts thereof, wherein Q is as described above and n is 0 to 9, such as 1 to 9. Preferably n is 0 to 3, such as 1 to 3.

In particular, the group Y of the reagent may comprise a group having the formula —CQ(PO$_3$H$_2$)$_2$, partial esters thereof, or salts thereof, wherein Q is H or a C1-C6 alkyl group, such as a methyl or ethyl group, but is preferably H. For example, the organic group may comprise a group having the formula —CO—Z—CH(PO$_3$H$_2$)$_2$ or —SO$_2$—Z—CH(PO$_3$H$_2$)$_2$, partial esters thereof, or salts thereof, wherein Z is O, S, or NR' and R' is H, a C1-C18 alkyl group, a C1-C18 acyl group, an aralkyl group, an alkaryl group, or an aryl group. Preferably, Z is NH, and, thus, the substituent group comprises at least one alkyl amide group wherein the alkyl group is a geminal bisphosphonic acid group, partial esters thereof, or salts thereof.

Y may also be further substituted with one or more additional functional groups, particularly when Y is an aromatic group. Examples of functional groups include, but are not limited to, R', OR', COR', COOR', OCOR', carboxylates, halogens, CN, NR'$_2$, SO$_3$H, sulfonates, sulfates, NR'(COR'), CONR'$_2$, imides, NO$_2$, phosphates, phosphonates, N=NR', SOR', NR'SO$_2$R', and SO$_2$NR$_2$', wherein R' of these functional groups, which can be the same or different, is independently hydrogen, branched or unbranched C1-C20 substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

The modified pigment, which comprises the reaction product of a pigment and at least one reagent described above, can be prepared using any method known in the art. In particular, the modified pigment can be prepared by a method comprising the steps of combining at least one pigment and at least one reagent having the formula H$_2$N-A-Y described above and reacting the pigment and the reagent to form the modified pigment. Preferably these steps occur simultaneous and in the same reaction vessel. Any conditions appropriate for reacting these components can be used and will differ depending on the specific nature of the pigment and the reagent. In general, these components are reacted at a temperature desirable to promote reaction of the reagent with the pigment, such as greater than 100° C. which is particularly useful for promoting dehydration reactions, but less than the decomposition temperature of the specific reagent. For example, the temperature can be between about 100° C. to about 200° C., including between about 120° C. and 150° C. Furthermore, the components are also combined, in general, for a time between about 30 minutes and about 24 hours, depending on, for example, the desired extent of reaction and the type of reagents used. In addition, the amount of each component may also be varied depending, for example, on the desired final properties of the modified pigment. For example, the total amount of reagent used may be from about 0.01 to about 10.0 micromoles/m$^2$ surface area of pigment, as measured by nitrogen adsorption (BET method), including from about 0.5 to about 5.0 micromoles/m$^2$, from about 1 to about 3 micromoles/m$^2$, or from about 2 to about 2.5 micromoles/m$^2$.

Furthermore, as specific examples, the reagent may be either hydrazine (wherein A is NH and Y is H) or carbohydrazide (wherein A is NH and Y is a C(O)NH—NH$_2$ group). For these specific embodiments, the resulting modified pigment, formed by combining and reacting the pigment and the reagent, may optionally be further reacted with a second reagent which comprises at least one carbonyl group, which can be any of those described above. In this way, the modified pigment used in the inkjet ink composition of the present invention can comprise the reaction product of a pigment and at least one reagent having the formula H$_2$N-A-Y, wherein A is O, NH, or S and Y is H or comprises a —C(O)A-NH$_2$ group; and the resulting product can be further combined with at least one second reagent comprising at least one carbonyl functional group. The second reagent may further comprise at least one ionic group, at least one ionizable group, or a mixture of at least one ionic group and at least one ionizable group, and these groups may be any of those described above. Also, the second reagent may be polymeric.

The inkjet ink composition of the present invention can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides and fungicides, binders such as polymeric binders, pH control agents, drying accelerators, penetrants, and the like. The amount of a particular additive will vary depending on a variety of factors but are generally present in an amount ranging between 0% and 40% based on the weight of the inkjet ink composition. Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like. It is also within the bounds of the present invention to use colored pigments not meeting the specified structural requirements described above, along with the specific azo yellow pigment and synergist combination in order, for example, to produce a different shade of yellow (such as a redder or greener shade) or to improve the strength of the yellow color.

The inkjet ink compositions can be purified and/or classified to remove impurities and other undesirable free species which can co-exist as a result of the manufacturing process using any method known in the art including, for example, ultrafiltration/diafiltration using a membrane, reverse osmosis, and ion exchange. Also, the inkjet ink compositions can be subjected to a classification step, such as filtration, centrifugation, or a combination of the two methods to substantially remove particles having a size above, for example, about 1.0 micron. In this way, unwanted impurities or undesirable large particles can be removed to produce an inkjet ink composition with good overall properties.

As noted above, the inkjet ink composition of the present invention comprises a modified pigment which is the reaction product of specific types of pigments (having at least one carbonyl group) and a specific type of reagent (having the formula $H_2N$-A-Y). While not wishing to be bound by theory, it is believed that the amine group of the reagent reacts with the pigment, primarily with specific groups on the surface of the pigment. This amine group has enhanced reactivity compared to a typical amine due to the presence of the adjacent heteroatom group, A, having at least one unshared electron pair (sometimes referred to as the alpha-effect). For example, if the pigment is an organic colored pigment comprising an organic colorant having at least one ester group, it is believed that the amine of the reagent reacts with the ester group, forming an amide. In this way, it is believed that the resulting product is a modified pigment, which is a colorant comprising the pigment having attached at least one group having the formula —NH-A-Y. For example, when A of the reagent formula is NH and Y is not H, the modified pigment is believed to comprise the pigment having attached at least one organic group, wherein the organic group comprises at least one hydrazide group or at least one hydrazone group.

Also, while it is known in the art that surface functional groups of pigments can be reacted with reagents such as polymers, it has surprisingly been found that a reagent having the formula described below can react with pigments, especially non-modified pigments (i.e., pigments not having organic groups attached thereto), resulting in the formation of modified pigments having improved performance properties, particularly dispersion stability, and that, furthermore, such modified pigments, when used in an inkjet ink composition, produce printed images having improved print performance properties. In addition, while it is also known that modified pigments comprising a pigment having attached at least one organic group may be prepared by reacting a pigment having attached at least one functional group with a hydrazine reagent comprising the organic group (such as is described in, for example, U.S. Pat. Nos. 6,723,783, 6,911,073, and 7,173,078), it has also surprisingly been found that pigments that do not comprise an attached organic group (i.e., a non-modified pigment) can also react with such reagents, producing modified pigments having good overall properties, particularly in an inkjet ink composition. Thus, the inkjet ink composition of the present invention comprises the reaction product of a pigment that is not a modified pigment and a reagent having the formula described above. It would have been expected that it would be difficult to react an unmodified pigment (that is, pigments that do not have attached carbonyl groups) to an extent sufficient enough to form stable pigment dispersions that could be used to fulfill the demanding requirements of an inkjet ink.

The modified pigments used in the inkjet ink compositions of the present invention can be in a variety of different forms. For example, the modified pigment may be a dry form, such as a powder, pellet, granule, or cake. As used herein, the term "dry" relating to the form of the modified pigment does not mean substantially free of volatile material. Rather, the term refers to the physical state of the material. Thus, dry forms include forms containing a high level, such as about 50% or more, of a volatile solvent. The dry form may be a material having the consistency of, for example, a paste or putty in a solid or semi-solid form or may be, for example, a free flowing or tacky powder.

The modified pigment can also be in the form of a dispersion in a liquid vehicle. The vehicle can be any of those described above relating to the inkjet ink composition of the present invention. Thus, the vehicle can be either an aqueous or non-aqueous liquid vehicle, but is preferably a vehicle that contains water. The amount of modified pigment used in the dispersion form can be varied but is typically in an amount ranging from about 0.1% to about 20% based on the weight of the dispersion. Furthermore, the dispersion may contain suitable additives known in the art that impart desirable properties to the dispersion.

The dispersion of modified pigment can be prepared using any method known in the art. For example, the modified pigment in a dry form may be combined with the liquid vehicle with agitation to produce a stable dispersion. Any equipment known in the art, such as a media or ball mill, or other high shear mixing equipment can be used, and various conventional milling media may also be used. Alternatively, the dispersion can result directly from the reaction of the pigment and the reagent. Other methods for forming the dispersion will be known to one skilled in the art.

While, as noted above, the modified pigment of the present invention can be used in an inkjet ink composition, the modified pigment may also be used in a variety of other applications, including, for example, plastic compositions, aqueous or non-aqueous inks (other than inkjet inks), aqueous or non-aqueous coatings, rubber compositions, paper compositions and textile compositions. In particular, these modified pigments have been found to be capable of forming stable aqueous dispersions that can be used in various aqueous compositions, including, for example, automotive and industrial coatings, paints, toners, adhesives, latexes, and inks.

The present invention will be further clarified by the following examples, which are intended to be only exemplary in nature.

EXAMPLES

Example 1

A reagent used to prepare a modified pigment of the present invention was prepared as shown in Scheme 1 below.

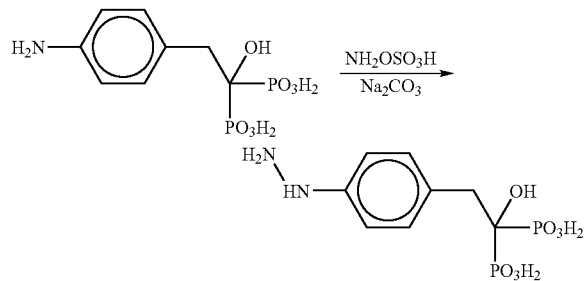

Scheme 1

Thus, 2-(4-(aminophenyl)-1-hydroxyethane-1,1-diyl) bisphosphonic acid monosodium salt (200 g, 0.627 moles, 1 equiv.), which was prepared using a procedure similar to that described in U.S. Patent Application Publication No. 2007/0100024, incorporated in its entirety by reference herein, was suspended in 1 L of DI water. The pH of the resulting suspension was adjusted to 8.5 by adding a saturated solution of sodium carbonate (135 mL). To this mixture was added 10-15 mL of a 50% aqueous sodium hydroxide solution to form a clear solution (pH 10.0). This was then cooled to 8° C. in an ice-water bath, and approximately 25 mL of a cold solution of hydroxylamine-O-sulfonic acid (100 g, 0.885 moles, 1.41 equiv.) in deionized water (100 mL) was added rapidly to bring the pH back to 8.5. The rest of the cold solution was then added drop-wise over a period of 30 minutes, while maintaining the pH of the reaction mixture between 8.1 and 8.2 by simultaneous addition of a saturated solution of sodium carbonate (250 mL). The reaction was allowed to continue for an additional 1.5 hrs at 5-10° C. at pH 8.1.

The reaction mixture was then filtered to remove any precipitated impurities, and the pH of the filtrate was adjusted to 2.4 by adding a 5N hydrochloric acid solution (600 mL) while keeping the temperature below 15° C. This solution was cooled to 5° C. for 1 hr, and the resulting precipitated product was removed by filtration, washed with a 2:1 water/methanol mixture (250 mL), with methanol (200 mL), and finally with acetone (200 mL), and then dried at reduced pressure and ambient temperature, yielding 140-160 g (67-76% yield) of 2-(4-(hydrazinophenyl)-1-hydroxyethane-1,1-diyl) bisphosphonic acid as a pale yellow solid. $^1$H NMR (400 MHz, D$_2$O+NaOH) data for this compound was as follows: δ 7.32 (2H, d, 7.6 Hz), 6.83 (2H, d, 7.6 Hz), and 3.2 (2.9H, m), with additional peaks of 7.22 (0.9H, d, 7.6 Hz), 6.69 (0.8H, d, 7.6 Hz), indicating the material contained unreacted starting material and was approximately 75% pure. $^{13}$C NMR (100 MHz, D$_2$O+NaOH) data for this compound was as follows: 147.8, 143.4, 132.4, 132.2, 115.4, 113.1, 75.8 (t), 38.9, 38.8. LC-MS data for this compound was as follows: 311 (M-23)$^+$. This was used without further purification as a reagent for preparing the modified pigments of the present invention.

Examples 2-30

The following examples describe the preparation of modified pigments of the present invention that can be used to form inkjet ink compositions of the present invention.

Examples 2-16

Modified yellow pigments were prepared using the following general procedure. The specific amounts of each material and reaction conditions are shown in Table 1 below.

TABLE 1

| Ex # | Reagent | Treatment Level | water | ° C. | pH | # cycles | Na$^+$ (ppm) |
|---|---|---|---|---|---|---|---|
| 2 | 1.8 g | 0.2 mmol/g | 300 g | 160 | 10 | 2 | 1150 |
| 3 | 3.6 g | 0.4 mmol/g | 200 g | 140 | 9 | 1 | 1412 |
| 4 | 3.6 g | 0.4 mmol/g | 200 g | 140 | 9 | 2 | 1353 |
| 5 | 1.8 g | 0.2 mmol/g | 300 g | 120 | 8 | 1 | 1089 |
| 6 | 5.4 g | 0.6 mmol/g | 100 g | 120 | 10 | 1 | 2220 |
| 7 | 5.4 g | 0.6 mmol/g | 300 g | 120 | 8 | 2 | 1538 |
| 8 | 1.8 g | 0.2 mmol/g | 100 g | 160 | 8 | 2 | 1087 |
| 9 | 5.4 g | 0.6 mmol/g | 100 g | 160 | 10 | 1 | 1806 |
| 10 | 5.4 g | 0.6 mmol/g | 300 g | 160 | 8 | 1 | 1557 |
| 11 | 5.4 g | 0.6 mmol/g | 300 g | 160 | 10 | 2 | 1941 |
| 12 | 1.8 g | 0.2 mmol/g | 300 g | 120 | 10 | 1 | 1154 |
| 13 | 1.8 g | 0.2 mmol/g | 100 g | 160 | 8 | 1 | 900 |
| 14 | 1.8 g | 0.2 mmol/g | 100 g | 120 | 10 | 2 | 1286 |
| 15 | 5.4 g | 0.6 mmol/g | 100 g | 120 | 8 | 2 | 2026 |
| 16 | 1.8 g | 0.2 mmol/g | 300 g | 120 | 8 | 1 | 1030 |

The reagent prepared in Example 1 above (which was 75% pure) was dissolved in water, and the pH was adjusted to between 8 and 10 with an aqueous NaOH solution. 20 g of Pigment Yellow 185 (Paliotol Yellow D1155, available from BASF) was added to this solution, and the mixture was stirred with an overhead mixer for 30 minutes at room temperature. The resulting mixture was then transferred to a Pyrex dish, and the dish was placed in an oven and heated to a temperature greater than 100° C. until all of the water evaporated (approximately 2-5 hours). If desired, these steps could be repeated (i.e., a second cycle could be used) using the dried solid modified pigment from the first cycle in place of the starting Pigment Yellow 185. After these steps were completed, the resulting dried solid modified pigment was then transferred to a stainless steel beaker and redispersed with a Silverson mixer at 6000 rpms using 200 mL of water while adjusting the pH to 8-9 with an aqueous NaOH solution. The dispersion was sonicated with a Misonix sonic probe (at a power of 9.5) for 1 hour, diafiltered with DI water and a Spectrum membrane until the conductivity of the permeate was less than 200 S, and concentrated to approximately 15% solids, thereby producing an aqueous dispersion of a modified yellow pigment.

The sodium content of each dispersion was measured with an Orion Ion Selective Electrode, and the results, expressed on a solid basis, are also shown in Table 1 above. These values indicate the presence of attached bisphosphonic acid salt groups. Furthermore, the mean volume particle size (mV) of each dispersion was also measured using a Nanotrac® Particle Size Analyzer and was found to be between 110-130 nm, indicating that these dispersions could be used to form a stable inkjet ink composition.

Examples 17-27

Modified yellow pigments were prepared using the following general procedure. The specific amounts of each material and reaction conditions are shown in Table 2 below.

TABLE 2

| Ex # | Reagent | Treatment Level | % solids | ° C. | # cycles | Na+ (ppm) |
|---|---|---|---|---|---|---|
| 17 | 28 g | 1.5 mmol/g | 30% | 160 | 1 | 887 |
| 18 | 9.5 g | 0.5 mmol/g | 60% | 160 | 1 | 585 |
| 19 | 9.5 g | 0.5 mmol/g | 30% | 100 | 1 | 1038 |
| 20 | 9.5 g | 0.5 mmol/g | 60% | 100 | 2 | 968 |
| 21 | 18.8 g | 1.0 mmol/g | 45% | 130 | 1 | 1131 |
| 22 | 18.8 g | 1.0 mmol/g | 45% | 130 | 2 | 1398 |
| 23 | 9.5 g | 0.5 mmol/g | 30% | 160 | 2 | 580 |
| 24 | 28 g | 1.5 mmol/g | 60% | 100 | 1 | 1381 |
| 25 | 28 g | 1.5 mmol/g | 60% | 160 | 2 | 1194 |
| 26 | 28 g | 1.5 mmol/g | 30% | 100 | 2 | 1533 |
| 27 | 18.8 g | 1.0 mmol/g | 50% | 130 | 1 | 1000 |

100 g of Pigment Yellow 155 (Inkjet Yellow 4G, available from Clariant) was added to a Brabender mixer (C.W. Brabender's Small Batch Mixer) and, while mixing at approximately 30 rpm, an aqueous solution of 4-hydrazinobenzenesulfonic acid (available from TCI America) containing the amount of water needed to achieve the desired % solids and having a pH of 8 was also added into the Brabender. The combination of materials was mixed at a chosen temperature until a dry powder was obtained. If desired, this step could be repeated (i.e., a second cycle could be used) by adding more of the aqueous solution of the hydrazine reagent. After these steps were completed, the resulting dried solid modified pigment was then transferred to a stainless steel beaker and redispersed with a Silverson mixer at 6000 rpms using 200 mL of water while adjusting the pH to 8-9 with an aqueous NaOH solution. The dispersion was sonicated with a Misonix sonic probe (at a power of 9.5) for 1 hour, diafiltered with DI water and a Spectrum membrane until the conductivity of the permeate was less than 200 S, and concentrated to approximately 15% solids, thereby producing an aqueous dispersion of a modified yellow pigment.

The sodium content of each dispersion was measured with an Orion Ion Selective Electrode, and the results, expressed on a solid basis, are also shown in Table 2 above. These values indicate the presence of attached sulfonic acid salt groups. Furthermore, the mean volume particle size (mV) of each dispersion was also measured using a Nanotrac® Particle Size Analyzer and was found to be between 170-180 nm, indicating that these dispersions could be used to form a stable inkjet ink composition.

Example 28

A modified yellow pigment was prepared as follows. Pigment Yellow 74 (20 g, available from Sun Chemical) was combined with 200 g of acetic acid in a stainless steel beaker to form a slurry. Into this mixture was added 3.8 grams of 4-hydrazinobenzenesulfonic acid (1 mmol/g of pigment treatment level), and the resulting mixture was heated to 90-100° C. while stirring with an overhead mechanical stirrer for 3 hours. After this time, the reaction mixture was allowed to cool to room temperature, and the resulting modified pigment was removed by filtration and washed with 200 mL of DI water. The modified yellow pigment presscake was then redispersed in 200 mL of DI water and the pH adjusted to 9.0 with a 10 N NaOH solution. After 30 minutes of mixing in a Silverson mixer at 6000 rpms and 1 hour of sonication with a Misonix sonic probe (at a power of 9.5), the dispersion was diafiltered with DI water and a Spectrum membrane until the conductivity of the permeate was less than 200 S, and concentrated to approximately 15% solids, thereby producing an aqueous dispersion of a modified yellow pigment. The resulting aqueous dispersion of modified yellow pigment was found to have a sodium content, measured with an Orion Ion Selective Electrode and expressed on a solid basis, of approximately 1000 ppm, indicating the presence of attached sulfonic acid salt groups, and a mean volume particle size (mV), measured using a Nanotrac® Particle Size Analyzer, of approximately 190 nm, indicating that this dispersion could be used to form a stable inkjet ink composition.

Example 29

Pigment Red 122 (148.4 g, PR122, available from Sun Chemical as a small particle presscake, 34% solids) was mixed with a solution of the reagent prepared in Example 1 above (17.51 g, 1 mmol/g of pigment treatment level, 75% pure) in 1 liter of DI water, and the pH of the mixture was adjusted to 8.5 with ammonium hydroxide. The resulting mixture was transferred to a Pyrex dish, and the dish was placed in an oven and heated at a temperature of 120° C. overnight, during which the water evaporated, forming the modified red pigment. The resulting dried solid modified pigment was redispersed with 400 mL DI water, and the pH of the dispersion was adjusted to 8.5 with an aqueous NaOH solution. The dispersion was mixed with a Silverson mixer at 6000 rpms for 30 minutes and then sonicated for 1 hour with a Misonix sonic probe (at a power of 9.5). The dispersion was then diafiltered with DI water and a Spectrum membrane until the conductivity of the permeate was less than 200 S to produce an aqueous dispersion of a modified red pigment. The mean volume particle size (mV), measured using a Nanotrac® Particle Size Analyzer, was found to be approximately 110 nm, indicating that this dispersion could be used to form a stable inkjet ink composition. The sodium content, measured with an Orion Ion Selective Electrode and expressed on a solid basis, was found to be 1971 ppm, and the phosphorus content, measured elemental analysis, as found to be 0.29% by weight of the dried pigment, indicating the presence of attached bisphosphonic acid salt groups.

Example 30

Pigment Blue 15:4 (162.7 g, PB15:4, SunFast Blue, presscake, 30.8% solids, available from Sun Chemical) was mixed with a solution of the reagent prepared in Example 1 above (17.51 g, 1 mmol/g of pigment treatment level, 75% pure) in 1 liter of DI water, and the pH of the mixture was adjusted to 8.5 with ammonium hydroxide. The resulting mixture was transferred to a Pyrex dish, and the dish was placed in an oven and heated at a temperature of 120° C. overnight, during which the water evaporated, forming the modified blue pigment. The resulting dried solid modified pigment was redispersed with 400 mL DI water, and the pH of the dispersion was adjusted to 8.5 with an aqueous NaOH solution. The dispersion was mixed with a Silverson mixer at 6000 rpms for 30 minutes and then sonicated for 1 hour with a Misonix sonic probe (at a power of 9.5). The dispersion was then diafiltered with DI water and a Spectrum membrane to a conductivity of less than 200 S to produce an aqueous dispersion of a modified blue pigment. The mean volume particle size (mV), measured using a Nanotrac® Particle Size Analyzer, was found to be approximately 140 nm, indicating that this dispersion could be used to form a stable inkjet ink composition. The sodium content, measured with an Orion Ion Selective Electrode and expressed on a solid basis, was found to be 3155 ppm, and the phosphorus content, measured elemental analysis, as found to be 0.54% by weight of the dried pigment, indicating the presence of attached bisphosphonic acid salt groups.

Examples 31-38

The following examples describe the preparation of modified carbon blacks of the present invention that can be used to form inkjet ink compositions of the present invention.

Example 31

Carbon black (49.91 g, Black Pearls® 700 carbon black (BP700), available from Cabot Corporation) was mixed with the reagent prepared in Example 1 (15.5 g, 0.7 mmol/g of carbon black treatment level) in 500 g of DI water, and the pH of the dispersion was adjusted to 9.1 with ammonium hydroxide. The mixture was then heated in an oven in a Pyrex dish at 120° C. overnight. The resulting dried solid modified carbon black was redispersed in DI water and further processed using the procedure described in Examples 29 and 30, thereby forming an aqueous dispersion of the modified carbon black. The mean volume particle size (mV), measured using a Nanotrac® Particle Size Analyzer, was found to be approximately 135-140 nm, indicating that this dispersion could be used to form a stable inkjet ink composition. The sodium content, measured with an Orion Ion Selective Electrode and expressed on a solid basis, was found to be 6446 ppm, and the phosphorus content, measured elemental analysis, was found to be 0.82% by weight of the dried pigment, indicating the presence of attached bisphosphonic acid salt groups.

Example 32

A dried solid modified carbon black was prepared using the procedure described in Example 31 using carbon black (49.91 g, Black Pearls® 700 carbon black (BP700), available from Cabot Corporation) and the reagent prepared in Example 1 (11.11 g, 0.5 mmol/g of carbon black treatment level, 75% pure). The dried modified pigment was then mixed with a second amount of the reagent (11.11 grams, 0.5 mmol/g of carbon black treatment level) in 500 g DI water, and the pH of the dispersion was adjusted to pH 8.5 with ammonium hydroxide. The mixture was heated a second time in an oven in a Pyrex dish at 120° C. overnight. The resulting final dried solid modified carbon black was redispersed in DI water and further processed using the procedure described in Examples 29 and 30, thereby forming an aqueous dispersion of the modified carbon black. The mean volume particle size (mV), measured using a Nanotrac® Particle Size Analyzer was found to be approximately 135-140 nm, indicating that this dispersion could be used to form a stable inkjet ink composition. The sodium content, measured with an Orion Ion Selective Electrode and expressed on a solid basis, was found to be 8434 ppm, and the phosphorus content, measured elemental analysis, as found to be 1.36% by weight of the dried pigment, indicating the presence of attached bisphosphonic acid salt groups.

Example 33

An aqueous dispersion of a modified carbon black was prepared using the procedure described in Example 31, with the exception that Regal™ 250 carbon black (R250, available from Cabot Corporation) was used as the carbon black and the reagent used was in an amount of 1.0 mmol/g of carbon black treatment level. The mean volume particle size (mV), measured using a Nanotrac® Particle Size Analyzer, was found to be approximately 153 nm, indicating that this dispersion could be used to form a stable inkjet ink composition. The sodium content, measured with an Orion Ion Selective Electrode and expressed on a solid basis, was found to be 4207 ppm, and the phosphorus content, measured elemental analysis, as found to be 0.75% by weight of the dried pigment, indicating the presence of attached bisphosphonic acid salt groups.

Example 34

An aqueous dispersion of a modified carbon black was prepared using the procedure described in Example 31, with the exception that the reagent used was in an amount of 1.0 mmol/g of carbon black treatment level. The mean volume particle size (mV), measured using a Nanotrac® Particle Size Analyzer, was found to be approximately 135-140 nm, indicating that this dispersion could be used to form a stable inkjet ink composition. The sodium content, measured with an Orion Ion Selective Electrode and expressed on a solid basis, was found to be 6276 ppm, and the phosphorus content, measured elemental analysis, as found to be 1.05% by weight of the dried pigment, indicating the presence of attached bisphosphonic acid salt groups.

Example 35

Carbon black (20 g, Black Pearls® 700 carbon black (BP700), available from Cabot Corporation) was mixed with 200 g of acetic acid in a stainless steel beaker. Into this mixture was added the reagent prepared in Example 1 (9.6 g, 1.0 mmol/g of carbon black treatment level, 75% pure). The resulting reaction mixture was heated to 90-100° C. while stirring with an overhead mechanical stirrer for 3 hours. This was then allowed to cool to room temperature, and the resulting modified carbon black was removed by filtration and washed with 200 mL of DI water. The modified pigment presscake was dispersed in 200 mL of DI water, and the pH was adjusted to 9.0 with a 10 N NaOH solution. The dispersion was mixed with a Silverson mixer at 6000 rpms for 30 minutes and then sonicated with a Misonix sonic probe (at a power of 9.5) for 1 hour. The dispersion was then diafiltered with DI water and a Spectrum membrane to a conductivity of less than 200 S to produce an aqueous dispersion of a modified carbon black. The mean volume particle size (mV), measured using a Nanotrac® Particle Size Analyzer was found to be approximately 135-140 nm, indicating that this dispersion could be used to form a stable inkjet ink composition. The sodium content, measured with an Orion Ion Selective Electrode and expressed on a solid basis, was found to be 11908 ppm, and the phosphorus content, measured elemental analysis, as found to be 1.22% by weight of the dried pigment, indicating the presence of attached bisphosphonic acid salt groups.

Example 36

An aqueous dispersion of a modified carbon black was prepared using the procedure described in Example 35, with the exception that diethylene glycol was used in place of acetic acid. The mean volume particle size (mV), measured using a Nanotrac® Particle Size Analyzer was found to be approximately 135-140 nm, indicating that this dispersion could be used to form a stable inkjet ink composition. The sodium content, measured with an Orion Ion Selective Electrode and expressed on a solid basis, was found to be 6039 ppm, and the phosphorus content, measured elemental analysis, as found to be 0.78% by weight of the dried pigment, indicating the presence of attached bisphosphonic acid salt groups.

Comparative Example 1

Using the procedure described in Example 31, carbon black (20 g, Black Pearls® 700 carbon black (BP700), available from Cabot Corporation) was mixed with 2-(4-(aminophenyl)-1-hydroxyethane-1,1-diyl) bisphosphonic acid monosodium salt (1.0 mmol/g of carbon black), which is the starting material used to prepare the reagent of Example 1. This does not comprise a group having the formula $H_2N$-A-Y wherein A is O, NH, or S but rather comprises an amine group. Following the procedure of Example 31, no dispersion of modified carbon black formed.

Comparative Example 2

Using the procedure described in Example 31, graphite (20 g, powder having a particle size of less than 20 m, available from Aldrich) was mixed with 2-(4-(aminophenyl)-1-hydroxyethane-1,1-diyl) bisphosphonic acid monosodium salt (6.9 g), which is the starting material used to prepare the reagent of Example 1. This does not comprise a group having the formula $H_2N$-A-Y wherein A is O, NH, or S. but rather comprises an amine group. Following the procedure of Example 31, no dispersion of modified carbon black formed.

Comparative Example 3

Carbon black (20 g, Black Pearls® 700 carbon black, available from Cabot Corporation) was mixed with alendronate monosodium salt (6.4 g, 1.0 mmol/g of carbon black treatment level) in 100 g of DI water, and the pH of the dispersion was adjusted to 10 with ammonium hydroxide. Alendronate monosodium salt comprises an amine group and is not a reagent comprising a group having the formula $H_2N$-A-Y wherein A is O, NH, or S. The mixture was then heated in an oven in a Pyrex dish at 120° C. After 2 hours, all of the liquid had evaporated, and the resulting dried solid carbon black was combined with 200 mL of DI water and the pH adjusted to 9 with a dilute aqueous NaOH solution. No dispersion formed, even after mixing with a Silverson mixer at 6000 rpms for 30 minutes and then sonicating with a Misonix sonic probe.

Example 37-47

The following examples describe the preparation and print performance properties of inkjet ink compositions of the present invention.

Examples 37-41

For each of these examples, a modified pigment was prepared using the following general procedure. The specific types of each material are shown in Table 3 below. In this table, EBPH is the reagent prepared in Example 1 (75% pure) and pABAH is 4-hydrazinobenzoic acid (available from Alpha Aesar).

TABLE 3

| Ex # | Pigment | Reagent | Treatment Level | mV | $Na^+$ (ppm) |
|---|---|---|---|---|---|
| 37 | PY155 | EBPH | 1 mmol/g | 180 nm | 2100 |
| 38 | PY213 | pABAH | 1.5 mmol/g | 80 nm | 900 |
| 39 | PY213 | EBPH | 1 mmol/g | 80 nm | 1213 |
| 40 | PY185 | pABAH | 1.5 mmol/g | 115 nm | 1088 |
| 41 | PY185 | EBPH | 1 mmol/g | 115 nm | 2050 |

The desired yellow pigment (50 g of either Pigment Yellow 155 (PY155), Inkjet Yellow 4G available from Clariant, Pigment Yellow 213 (PY213), Inkjet Yellow H5G, available from Clariant, or Pigment Yellow 185 (PY185), Paliotol Yellow D1155, available from BASF) was mixed with the desired reagent (22.4 g of the reagent prepared in Example 1, 75% pure, or 11.4 g of pABAH) dissolved in 500 mL water. The mixture was mixed with a Silverson mixer (5000 rpms), and the pH was adjusted to 8.2 with a 10% aqueous NaOH solution. The resulting mixture was then transferred to a Pyrex dish, and the dish was placed in an oven heated to a temperature of 120° C. After 6 hours, all of the water evaporated. The resulting dried solid modified pigment was then removed from the oven and allowed to cool to room temperature, and this was then mixed with 500 mL of DI water and pH adjusted to 9 with a 10% aqueous NaOH solution. After mixing with a Silverson mixer at 6000 rpms for 30 minutes, the dispersion was sonicated with a Misonix sonic probe (at a power of 9.5) for 1 hour, diafiltered with DI water and a Spectrum membrane until the conductivity of the permeate was less than 200 S, and concentrated to approximately 15% solids, thereby producing an aqueous dispersion of a modified yellow pigment.

The sodium content of each dispersion was measured with an Orion Ion Selective Electrode, and the results, expressed on a solid basis, are also shown in Table 3 above. These values indicate the presence of attached bisphosphonic acid salt groups. Furthermore, the mean volume particle size (mV) of each dispersion was also measured using a Nanotrac® Particle Size Analyzer and are also shown in Table 3 above. These values indicate that these dispersions could be used to form a stable inkjet ink composition.

Ink compositions comprising the modified pigments shown in Table 3 were prepared according to the formulation shown in Table 4 (the percentages are percent by weight).

TABLE 4

| Component | Concentration |
|---|---|
| Modified Pigment | 8% |
| Triethylene glycol monobutyl ether (TGMBE) | 8% |
| Surfynol 465 | 1.5% |
| Glycerin | 8% |
| DI Water | 74.5% |

Images were printed onto Xerox 4200 paper with an Epson C88 printer. ImageXpert™ was used to measure the a* and b* values for each image as well as the darkness parameter (L*) of the image. Chromaticity of color, c*, is defined as parameter $c^* = (a^{*2} + b^{*2})^{0.5}$. Color saturation is closely related to the chromaticity of color as well as the darkness of the color and is defined as c*/L*. Color saturation values were determined for each example, and the results are shown in FIG. 1. As these results show, the inkjet ink compositions of the present invention produce printed images having very good color values.

Example 42-46

For examples 42-25, the modified pigments of Examples 29-32 were used respectively to prepare inkjet ink compositions of the present invention. For example 46, a modified carbon black was prepared using the procedure described in Example 31, with the exception that Vulcan® 7H carbon black was used. The specific types of each material are shown in Table 5 below. In addition, the sodium content of each dispersion, measured with an Orion Ion Selective Electrode and expressed on a solid basis, as well as the mean volume particle size (mV) of each dispersion, measured using a Nanotrac® Particle Size Analyzer, are also shown in Table 5.

TABLE 5

| Ex # | Pigment | Reagent | Treatment Level | mV | Na+ (ppm) |
|---|---|---|---|---|---|
| 42 | PR122 | EBPH | 1 mmol/g | 110 nm | 1971 |
| 43 | PB15:4 | EBPH | 1 mmol/g | 140 nm | 3155 |
| 44 | BP700 | EBPH | 0.7 mmol/g | 135-140 nm | 6446 |
| 45 | BP700 | EBPH | 0.5 + 0.5 mmol/g | 135-140 nm | 8434 |
| 46 | V7H | EBPH | 1 mmol/g | 155 nm | 4207 |

Ink compositions comprising the modified pigments shown in Table 5 were prepared according to the formulation shown in Table 6 (the percentages are percent by weight).

TABLE 6

| Component | Concentration |
|---|---|
| Modified Pigment | 4% |
| Trimethylol propane | 7% |
| Surfynol 465 | 1% |
| Glycerol | 7% |
| Diethylene glycol | 5% |
| DI Water | 76% |

Images were printed onto various types of papers using a Canon i4000 printer, and the optical density (OD) of the resulting images was measured using a SpectroEye SpectroDensitometer. Results are shown in Table 7 below. As these results show, the inkjet ink compositions of the present invention produce printed images having very good print properties.

TABLE 7

| Ex # | HCP | HPMP | Xerox4200 | Average OD |
|---|---|---|---|---|
| 42 | 1.10 | 1.07 | 1.12 | 1.10 |
| 43 | 1.06 | 1.13 | 1.05 | 1.08 |
| 44 | 1.32 | 1.55 | 1.34 | 1.40 |
| 45 | 1.32 | 1.55 | 1.34 | 1.40 |
| 46 | 1.33 | 1.50 | 1.32 | 1.38 |

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An inkjet ink composition comprising a liquid vehicle and at least one modified pigment, wherein the modified pigment comprises the reaction product of:
   a) a pigment and
   b) at least one reagent having the formula $H_2N-A-Y$, wherein Y is H, a C1-C12 alkyl group, an aromatic group, a polymeric group, or a group comprising a $—C(O)A-NH_2$ group, and A is O, NH, or S,
   wherein the pigment is selected from oxidized carbonaceous pigments, non-oxidized carbonaceous pigments, and non-modified pigments and;
   wherein Y further comprises at least one second group selected from:
   (i) at least one ionic group, at least one ionizable group, or a mixture of at least one ionic group and at least one ionizable group;
   (ii) at least one sulfonic acid group or salt thereof, at least one carboxylic acid group or salt thereof, at least one amine group, or at least one ammonium group;
   (iii) at least one geminal bisphosphonic acid group, partial esters thereof, or salts thereof;
   (iv) at least one group having the formula $—CQ(PO_3H_2)_2$, partial esters thereof, or salts thereof, wherein Q is H, R, OR, SR, or $NR_2$, wherein R, which can be the same or different, is H, a C1-C18 alkyl group, a C1-C18 acyl group, an aralkyl group, an alkaryl group, or an aryl group; or
   (v) at least one group having the formula $—CO—Z—CH(PO3H2)_2$ or $—SO2-Z—CH(PO3H2)2$ or salts thereof, wherein Z is O, S, or NR' and R' is H, a C1-C18 alkyl group, a C1-C18 acyl group, an aralkyl group, an alkaryl group, or an aryl group.

2. The inkjet ink composition of claim 1, wherein the pigment is a non-modified pigment.

3. The inkjet ink composition of claim 1, wherein the pigment is an organic colored pigment.

4. The inkjet ink composition of claim 3 wherein the organic colored pigment is a blue pigment, a black pigment, a brown pigment, a cyan pigment, a green pigment, a white pigment, a violet pigment, a magenta pigment, a red pigment, an orange pigment, a yellow pigment, or mixtures thereof.

5. The inkjet ink composition of claim 3, wherein the organic colored pigment comprises at least one organic colorant, and wherein the organic colorant comprises at least one carbonyl functional group.

6. The inkjet ink composition of claim 5, wherein the carbonyl functional group is a ketone group, an aldehyde group, an ester group, an amide group, an imide group, an anhydride group, or a carboxylic acid group or salt thereof.

7. The inkjet ink composition of claim 6, wherein the imide group is a barbituric acid group.

8. The inkjet ink composition of claim 1, wherein the pigment is carbon black.

9. The inkjet ink composition of claim 8, wherein the carbon black has a pH value greater than 7.0.

10. The inkjet ink composition of claim 1, wherein the pigment is an oxidized carbon black.

11. The inkjet ink composition of claim 1 wherein Y is (iv) and is selected from the formula $—(CH_2)_n—CQ(PO_3H_2)_2$, partial esters thereof, or salts thereof, wherein n is 1 to 3.

12. The inkjet ink composition of claim 1, wherein Y is (iv) and Q is H or a C1-C6 alkyl group.

13. The inkjet ink composition of claim 1, wherein Y is (v) and Z is NH.

14. The inkjet ink composition of claim 1, wherein the reagent is an arylhydrazine.

15. The inkjet ink composition of claim 1, wherein the reagent is an alkylhydrazine.

16. The inkjet ink composition of claim 1, wherein the reagent is hydrazine.

17. The inkjet ink composition of claim 1, wherein the modified pigment comprises the pigment having attached at least one group having the formula —HN-A-Y.

18. The inkjet ink composition of claim 1, wherein the liquid vehicle is an aqueous vehicle.

19. A modified organic colored pigment comprising the reaction product of:
 a) an organic colored pigment and
 b) at least one reagent having the formula $H_2N$-A-Y, wherein Y is H, a C1-C12 alkyl group, an aromatic group, a polymeric group, or a group comprising a —C(O)A-$NH_2$ group, and A is O, NH, or S and;
 wherein Y further comprises at least one second group selected from:
 (i) at least one ionic group, at least one ionizable group, or a mixture of at least one ionic group and at least one ionizable group;
 (ii) at least one sulfonic acid group or salt thereof, at least one carboxylic acid group or salt thereof, at least one amine group, or at least one ammonium group;
 (iii) at least one geminal bisphosphonic acid group, partial esters thereof, or salts thereof;
 (iv) at least one group having the formula —CQ(PO3H2)2, partial esters thereof, or salts thereof, wherein Q is H, R, OR, SR, or NR2, wherein R, which can be the same or different, is H, a C1-C18 alkyl group, a C1-C18 acyl group, an aralkyl group, an alkaryl group, or an aryl group; or
 (v) at least one group having the formula —CO—Z—CH(PO3H2)2 or —SO2-Z—CH(PO3H2)2 or salts thereof, wherein Z is O, S, or NR' and R' is H, a C1-C18 alkyl group, a C1-C18 acyl group, an aralkyl group, an alkaryl group, or an aryl group.

20. The modified pigment of claim 19, wherein the modified pigment is in dispersion form.

21. The modified pigment of claim 19, wherein the modified pigment is in solid form.

22. A modified carbon black comprising the reaction product of:
 a) a carbon black and
 b) at least one reagent having the formula $H_2N$-A-Y, wherein Y is an aromatic group, a polymeric group, or a group comprising a —C(O)A-$NH_2$ group, and A is O, NH, or S; wherein Y further comprises at least one ionic group, at least one ionizable group, or a mixture of at least one ionic group and at least one ionizable group.

23. The modified pigment of claim 22, wherein the modified pigment is in dispersion form.

24. The modified pigment of claim 22, wherein the modified pigment is in solid form.

25. A modified carbon black comprising the reaction product of:
 a) a carbon black and
 b) at least one reagent having the formula $H_2N$-A-Y, wherein Y is a polymeric group and;
 wherein Y further comprises at least one second group selected from:
 (i) at least one ionic group, at least one ionizable group, or a mixture of at least one ionic group and at least one ionizable group;
 (ii) at least one sulfonic acid group or salt thereof, at least one carboxylic acid group or salt thereof, at least one amine group, or at least one ammonium group;
 (iii) at least one geminal bisphosphonic acid group, partial esters thereof, or salts thereof;
 (iv) at least one group having the formula —CQ($PO_3H_2$)$_2$, partial esters thereof, or salts thereof, wherein Q is H, R, OR, SR, or $NR_2$, wherein R, which can be the same or different, is H, a C1-C18 alkyl group, a C1-C18 acyl group, an aralkyl group, an alkaryl group, or an aryl group; or
 (v) at least one group having the formula —CO—Z—CH($PO_3H_2$)$_2$ or —$SO_2$—Z—CH($PO_3H_2$)$_2$ or salts thereof, wherein Z is O, S, or NR' and R' is H, a C1-C18 alkyl group, a C1-C18 acyl group, an aralkyl group, an alkaryl group, or an aryl group.

26. The modified pigment of claim 25, wherein the modified pigment is in dispersion form.

27. The modified pigment of claim 25, wherein the modified pigment is in solid form.

28. An inkjet ink composition comprising a liquid vehicle and at least one modified pigment, wherein the modified pigment comprises the reaction product of:
 a) a pigment and
 b) at least one reagent having the formula $H_2N$-A-Y, wherein Y is H, a C1-C12 alkyl group, an aromatic group, a polymeric group, or a group comprising a —C(O)A-$NH_2$ group, and A is O, NH, or S,
 wherein the pigment is an organic colored pigment comprising at least one organic colorant, and wherein the organic colorant comprises at least one carbonyl function group.

29. The inkjet ink composition of claim 28, wherein the carbonyl functional group is a ketone group, an aldehyde group, an ester group, an amide group, an imide group, an anhydride group, or a carboxylic acid group or salt thereof.

30. The inkjet ink composition of claim 29, wherein the imide group is a barbituric acid group.

31. The inkjet ink composition of claim 28, wherein Y further comprises at least one second group selected from at least one ionic group, at least one ionizable group, or a mixture of at least one ionic group and at least one ionizable group.

32. The inkjet ink composition of claim 28, wherein Y further comprises at least one second group selected from at least one sulfonic acid group or salt thereof, at least one carboxylic acid group or salt thereof, at least one amine group, or at least one ammonium group.

33. The inkjet ink composition of claim 28, wherein Y further comprises at least one second group selected from at least one geminal bisphosphonic acid group, partial esters thereof, or salts thereof.

34. The inkjet ink composition of claim 28, wherein Y further comprises at least one second group selected from at least one group having the formula —CQ($PO_3H_2$)$_2$, partial esters thereof, or salts thereof, wherein Q is H, R, OR, SR, or $NR_2$, wherein R, which can be the same or different, is H, a C1-C18 alkyl group, a C1-C18 acyl group, an aralkyl group, an alkaryl group, or an aryl group.

35. The inkjet ink composition of claim 28, wherein Y further comprises at least one second group selected from at least one group having the formula —($CH_2$)$_n$—CQ($PO_3H_2$)$_2$, partial esters thereof, or salts thereof, wherein n is 1 to 3.

36. The inkjet ink composition of claim 35, wherein Q is H or a C1-C6 alkyl group.

37. The inkjet ink composition of claim 28, wherein Y further comprises at least one second group selected from at least one group having the formula —CO—Z—CH($PO_3H_2$)$_2$ or —$SO_2$—Z—CH($PO_3H_2$)$_2$ or salts thereof, wherein Z is O, S, or NR' and R' is H, a C1-C18 alkyl group, a C1-C18 acyl group, an aralkyl group, an alkaryl group, or an aryl group.

38. The inkjet ink composition of claim 37, wherein Z is NH.

39. The inkjet ink composition of claim 28, wherein the reagent is an arylhydrazine.

40. The inkjet ink composition of claim 28, wherein the reagent is an alkylhydrazine.

41. The inkjet ink composition of claim 28, wherein the reagent is hydrazine.

* * * * *